United States Patent
Carrender

(10) Patent No.: US 7,055,750 B2
(45) Date of Patent: Jun. 6, 2006

(54) DEVICE AND METHOD FOR ENCODING DATA IN MULTIPLE MEDIA

(75) Inventor: Curtis Lee Carrender, Morgan Hill, CA (US)

(73) Assignee: Battelle Memorial Institute K1-53, Richland, WA (US)

( * ) Notice: Subject to any disclaimer, the term of this patent is extended or adjusted under 35 U.S.C. 154(b) by 0 days.

(21) Appl. No.: 10/841,943

(22) Filed: May 7, 2004

(65) Prior Publication Data

US 2006/0081713 A1    Apr. 20, 2006

(51) Int. Cl.
*G06K 7/10* (2006.01)

(52) U.S. Cl. .................... 235/472.01; 235/375

(58) Field of Classification Search .......... 235/472.01, 235/472.02, 472.03, 454, 455, 492, 380, 235/375, 381, 382.5; 340/527.1, 10.1
See application file for complete search history.

(56) References Cited

U.S. PATENT DOCUMENTS

| | | | |
|---|---|---|---|
| 5,602,380 A | 2/1997 | Bishay | 235/472 |
| 6,109,526 A | 8/2000 | Ohanian et al. | 235/462.45 |
| 6,409,401 B1 | 6/2002 | Petteruti et al. | 400/88 |
| 6,424,262 B1 | 7/2002 | Garber et al. | 340/572.3 |
| 2002/0113127 A1 | 8/2002 | Takeuchi et al. | 235/462.25 |
| 2002/0113707 A1 | 8/2002 | Grunes et al. | 340/572.1 |
| 2002/0167406 A1 | 11/2002 | Garber et al. | 340/572.7 |
| 2003/0227528 A1* | 12/2003 | Hohberger et al. | 347/104 |
| 2004/0257203 A1* | 12/2004 | Maltsev et al. | 340/10.1 |
| 2004/0257231 A1* | 12/2004 | Grunes et al. | 340/572.1 |
| 2005/0058483 A1* | 3/2005 | Chapman et al. | 400/76 |
| 2005/0092844 A1* | 5/2005 | Zhang et al. | 235/487 |

FOREIGN PATENT DOCUMENTS

WO    WO 03/100705    12/2003

* cited by examiner

*Primary Examiner*—Thien M. Le
(74) *Attorney, Agent, or Firm*—Seed IP Law Group PLLC

(57) ABSTRACT

A system and related device for converting encoded data from one format into one or more formats, including barcode and radio frequency identification tag formats, the system including a programmer configured to read a barcode and using the barcode data encoded thereon automatically write the data to a radio frequency (RF) tag and to read the contents of a RF tag and automatically generate a barcode with the information contained in the tag or information related thereto, preferably without decoding the encoded data.

24 Claims, 4 Drawing Sheets

NORMAL CODE 39

1 2 3 4 5 6 7 8

DEVICE AND METHOD FOR ENCODING DATA IN MULTIPLE MEDIA

STATEMENT REGARDING FEDERALLY SPONSORED RESEARCH OR DEVELOPMENT

This invention was made with U.S. Government support under Contract DE-AC06-76RLO1830 awarded by the U.S. Department of Energy. The U.S. Government has certain rights in the invention.

BACKGROUND OF THE INVENTION

1. Field of the Invention

The present invention pertains to the reading and storing of data on machine-readable labels and, more particularly, to a device and method for reading, converting, and programming data in multiple media, including radio frequency identification tags and barcode labels.

2. Description of the Related Art

Various methods and systems exist for encoding data in machine-readable form, including devices that produce barcodes and related optical devices for reading barcodes, as well as radio devices such as transponders and radio frequency identification devices (RFID) or tags. These devices store information regarding an associated object that is tagged or labeled to permit machines to read the data associated with the object.

Barcodes generally consist of strips of dark and light indicia containing data that is optically read, and as such they provide a link between production, manufacturing, sales, and distribution of materials and the information associated with these materials. Printed data can be easily and automatically read by means of reading devices or scanners.

A barcode symbol consists of a barcode formed of colored bars and spaces. Barcode symbology can take many forms, such as normal code 39 shown in FIG. 1, which is a variable length symbology that can encode up to forty-four characters; extended 3 of 9 code that is a general purpose code capable of storing any ASCII character, code 93, which was designed to complement code 39 but has the advantage of being smaller; interleaved 2 of 5 used in the distribution industry for carton labeling where every interleaved 2 of 5 characters actually encodes two digits, one in the bars and one in the white spaces; code 128 that can handle any ASCII character and has eleven modules that may be either black or white with each character using three bars and three spaces; Codabar that is a general purpose barcode used primarily for numeric data and character symbols; the Zip+4 barcode used by the post office for sorting letters that is made up of tall and short bars with even spacing between the bars; UPC-A and UPC-E code that uses numeric symbology in retail applications for medium to small packages; and PDF417 that is a high density two-dimensional barcode symbology capable of encoding the entire ASCII set, the PDF standing for "portable data file" because it can encode as many as 2,725 data characters.

Barcode hardware typically consists of devices for producing and printing barcodes on labels, packages, and objects, and devices for reading and decoding the information encoded in the barcode, referred to as readers. Readers commonly take the form of wands that are a contact device dragged across the barcode in order to read and decode it. These are the least expensive of the barcode readers, and typically have a look and feel of a pen or pencil. Another reader is a charged coupled device (CCD) that utilizes solid-state technology to provide contact and non-contact scanning capabilities. While this device has an increased range and larger barcode reading capability than wands, the limitation is that the CCD technology can only scan as wide as the scan head. Laser technology provides high speed and longer focal length reading capabilities, but at the expense of utilizing moving parts, such as a mirror system. Focal ranges vary from three inches to thirty inches in most laser-configured readers.

While barcodes are a relatively recent technology and remain in continuous evolution and increasing use, such as on moving objects, delivery notes, warehouse schedules, labels, it is essential that the barcode be legible and that visual access to the barcode be available to enable reading. Barcodes cannot be read through adverse environmental conditions, such as dirt, rain, and other impediments to optical access.

A more recent technology is remote communication utilizing wireless equipment that typically relies on radio frequency (RF) technology, which is employed in many industries. One application of RF technology is in locating, identifying, and tracking objects, such as animals, inventory, and vehicles.

RF identification (RFID) tag systems have been developed that facilitate monitoring of remote objects. As shown in FIG. 2, a basic RFID system 10 includes two components: an interrogator or reader 12, and a transponder (commonly called an RF tag) 14. The interrogator 12 and RF tag 14 include respective antennas 16, 18. In operation, the interrogator 12 transmits through its antenna 16 a radio frequency interrogation signal 20 to the antenna 18 of the RF tag 14. In response to receiving the interrogation signal 20, the RF tag 14 produces an amplitude-modulated response signal 22 that is modulated back to the interrogator 12 through the tag antenna 18 by a process known as backscatter.

The conventional RF tag 14 includes an amplitude modulator 24 with a switch 26, such as a MOS transistor, connected between the tag antenna 18 and ground. When the RF tag 14 is activated by the interrogation signal 20, a driver (not shown) creates a modulating on/off signal 27 based on an information code, typically an identification code, stored in a non-volatile memory (not shown) of the RF tag 14. The modulating signal 27 is applied to a control terminal of the switch 26, which causes the switch 26 to alternately open and close. When the switch 26 is open, the tag antenna 18 reflects a portion of the interrogation signal 20 back to the interrogator 12 as a portion 28 of the response signal 22. When the switch 26 is closed, the interrogation signal 20 travels through the switch 26 to ground, without being reflected, thereby creating a null portion 29 of the response signal 22. In other words, the interrogation signal 20 is amplitude-modulated to produce the response signal 22 by alternately reflecting and absorbing the interrogation signal 20 according to the modulating signal 27, which is characteristic of the stored information code. The RF tag 14 could also be modified so that the interrogation signal is reflected when the switch 26 is closed and absorbed when the switch 26 is open. Upon receiving the response signal 22, the interrogator 12 demodulates the response signal 22 to decode the information code represented by the response signal. The conventional RFID systems thus operate with an oscillator or clock in which the RF tag 14 modulates a RF carrier frequency to provide an indication to the interrogator 12 that the RF tag 14 is present.

The substantial advantage of RFID systems is the non-contact, non-line-of-sight capability of the technology. The interrogator 12 emits the interrogation signal 20 with a range from one inch to one hundred feet or more, depending upon its power output and the radio frequency used. Tags can be read through a variety of substances such as odor, fog, ice, paint, dirt, and other visually and environmentally challenging conditions where bar codes or other optically-read technologies would be useless. RF tags can also be read at remarkable speeds, in most cases responding in less than one hundred milliseconds.

A typical RF tag system 10 often contains a number of RF tags 14 and the interrogator 12. RF tags are divided into three main categories. These categories are beam-powered passive tags, battery-powered semi-passive tags, and active tags. Each operates in fundamentally different ways.

The beam-powered RF tag is often referred to as a passive device because it derives the energy needed for its operation from the interrogation signal beamed at it. The tag rectifies the field and changes the reflective characteristics of the tag itself, creating a change in reflectivity that is seen at the interrogator. A battery-powered semi-passive RF tag operates in a similar fashion, modulating its RF cross-section in order to reflect a delta to the interrogator to develop a communication link. Here, the battery is the source of the tag's operational power. Finally, in the active RF tag, a transmitter is used to create its own radio frequency energy powered by the battery.

The range of communication for such tags varies according to the transmission power of the interrogator 12 and the RF tag 14. Battery-powered tags operating at 2,450 MHz have traditionally been limited to less than ten meters in range. However, devices with sufficient power can reach up to 200 meters in range, depending on the frequency and environmental characteristics.

BRIEF SUMMARY OF THE INVENTION

The disclosed embodiments of the invention are directed to a device and method that, in one embodiment, reads data from one medium and outputs encoded data in one or more other media. In accordance with an aspect of the present invention, the device reads data encoded in one form and converts the data to an at least one other form without decoding the data. For example, a reader is configured to scan a barcode and convert the barcode into a radio frequency signal encoded with the barcode data and to transmit the signal to an RFID tag that then stores the encoded data for later reading. The tag can be associated with the same object with which the barcode is associated.

In accordance with another embodiment of the invention, a device for reading RFID tags and producing a barcode encoded with data read from the tag is provided. Ideally the device is portable, handheld, and self-contained, i.e., it does not require access to another computer, communication network, or other device except the device from which the encoded data is read and the device to which the converted data is written.

In accordance with another aspect of the present invention, an RFID programmer is provided that is configured to read a barcode and to automatically program via radio frequency an associated RFID tag with the same information or with information related to the scanned barcode or to both.

In accordance with another embodiment of the invention, a programmer is provided that can read RFID data and automatically produce a barcode related to the information contained within the RFID tag from which the RFID data is read. In accordance with another aspect of this embodiment of the invention, a barcode programmer is configured to read the contents of an RFID tag and automatically produce a barcode with either the same information or information related to that contained within the RFID tag.

In accordance with another embodiment of the invention, a device for converting encoded data in multiple media is provided. The device is configured to read a barcode and to program an associated RFID tag with information that is the same or related to that encoded in the barcode or both. It is further configured to read the contents of an RFID tag and produce a barcode with either the same information or information related to that contained within the RFID tag or both.

In accordance with another embodiment of the present invention, a method for converting encoded data from one media to another media is provided. The method includes reading the encode data from a first media, converting the encoded data into a second encoded form, and writing the data encoded in the second form to a second media. Ideally, the data is not decoded when it is converted.

As will be readily appreciated from the foregoing, the disclosed embodiments of the present invention provide the ability to convert encoded data from one media to another in a convenient, rapid, and inexpensive fashion. A user can exploit the advantages of each media by maximizing their use, the environments where they perform the best, and providing quick and efficient conversion of encoded data, ideally without requiring decoding of this data. This enhances security by not providing access to the underlying information as it moves from one media to another.

BRIEF DESCRIPTION OF THE SEVERAL VIEWS OF THE DRAWINGS

The foregoing and other features and advantages of the disclosed embodiments of the present invention will be more readily appreciated as the same become better understood from the following detailed description when taken in conjunction with the accompanying drawings, wherein.

DETAILED DESCRIPTION OF THE INVENTION

Figure 1:
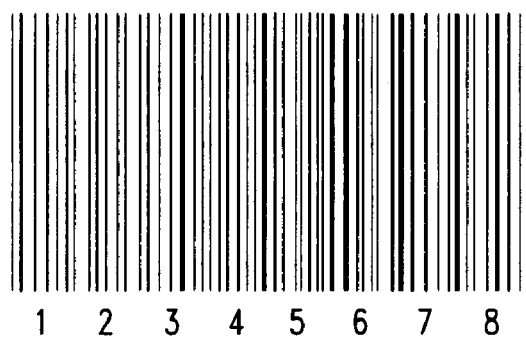
FIG. 1 is an illustration of a known barcode system.
Figure 2:
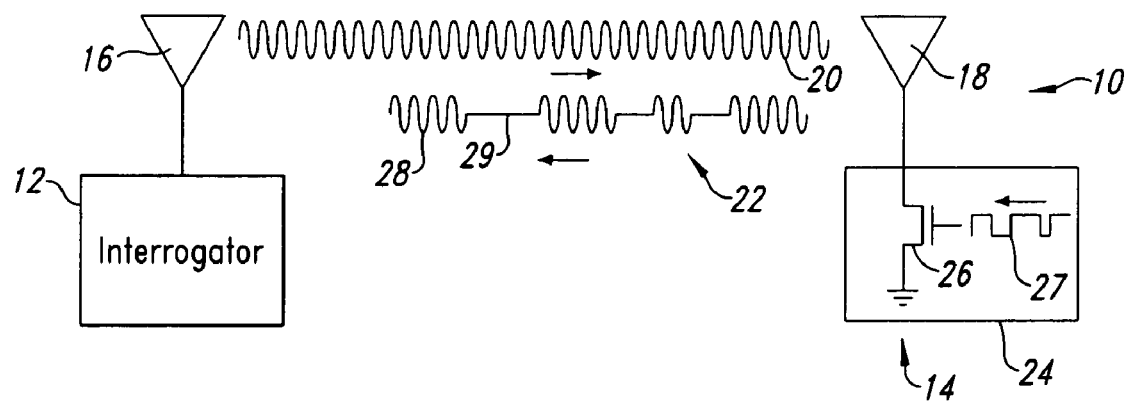
FIG. 2 is an illustration of a known radio frequency identification system.
Figure 3:
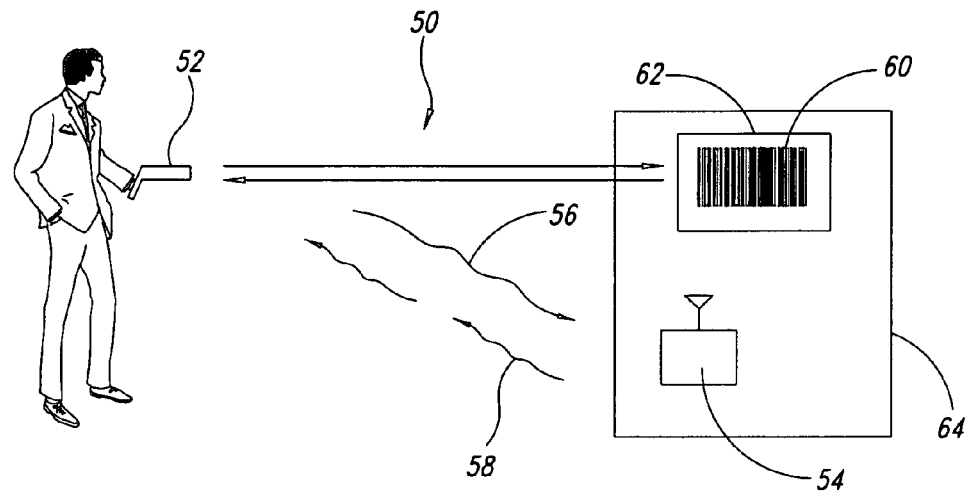
FIG. 3 is an illustration of a first embodiment of the present invention in the form of a system for reading and writing encoded data in multiple media.

Referring initially to FIG. 3, shown therein is a system 50 for converting encoded data in multiple media. The system 50 shown in this embodiment of the invention includes a programmer 52 configured to interrogate an RFID tag 54 with radio frequency signals 56, preferably in the range of 800 MHz to 2,500 MHz, and to receive modulated backscatter signals 58 from the tag 54. The tag 54 is configured to store information or data regarding an object 64 associated with the tag, such as the identity of the object, the origination of the object, the date the object was created, the destination of the object, operational information regarding the object, cost and sales information, manufacturer information, and the like. In one embodiment this information is stored in binary format in the tag 54 and retrieved upon receipt of the interrogation signal from the programmer 52 for modulation of the interrogation signal 56.

The programmer 52 is structured to process the returned modulated signal 58 and convert it to another format or medium, preferably a barcode 60 printed on a label 62. More particularly, the programmer 52 recovers the binary code from the returned signal and generates a barcode signal therefrom. The bar code signal is further processed to create a barcode in a particular format, such as the normal code 39. Ideally, this conversion takes place without the binary code being decoded into the raw data by the programmer 52. As such, the circuitry is greatly simplified and the process takes place at a high speed as compared to a system that decodes the data and then encodes it into another format.

The returned modulated signal 58 can be decoded for use by other systems if desired. However, this decoding would preferably take place outside the conversion process. The barcode signal is processed to cause a label with the barcode thereon to be generated for application to the object or packaging associated with the object.

Figure 4:
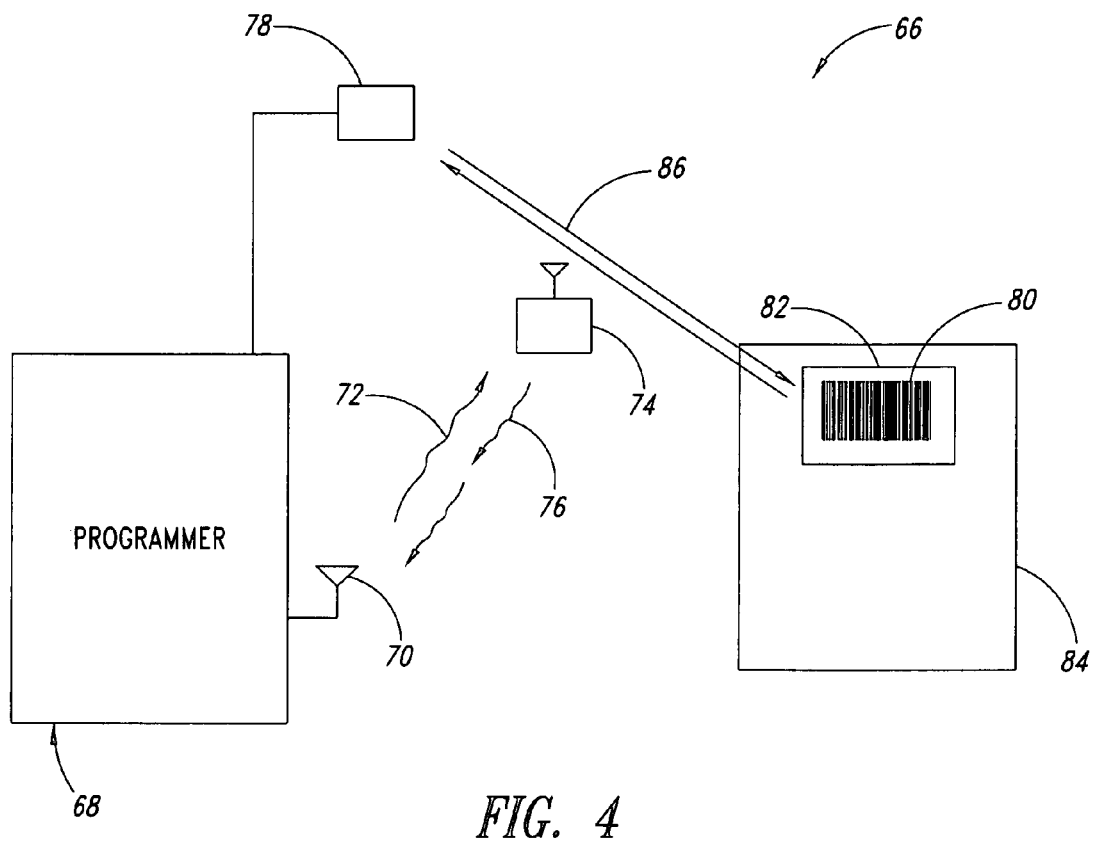
FIG. 4 is a schematic illustration of one embodiment of the invention used in conjunction with barcoded data and radio frequency identification tags.

In the embodiment shown in FIG. 4, the system 66 includes an interrogator 68 with an antenna 70 configured to send RF signals 72 to a tag 74 and to receive return signals 76 therefrom. In addition, the interrogator 68 includes a barcode head 78 configured to read a barcode 80 on a label 82 applied to an item 84. In this embodiment, the barcode head 78 reads the barcode 80, such as with an optical signal 86, and retrieves data stored in the barcode 80. In this example, the data can be in hexadecimal format. The interrogator 68 is configured to process the data in hexadecimal format and convert the same to RF signals for transmission to the tag 74, where the signals are received and processed for writing to a memory (not shown) in hexadecimal format. Alternatively, the data read from the barcode 80 can be converted from hexadecimal into binary or other format before being written to the tag 74. Once the data is stored in the tag 74, the tag 74 can be applied to the item 84 or to a container or package (not shown) in which the item is packed for storage or shipping.

Figure 5:
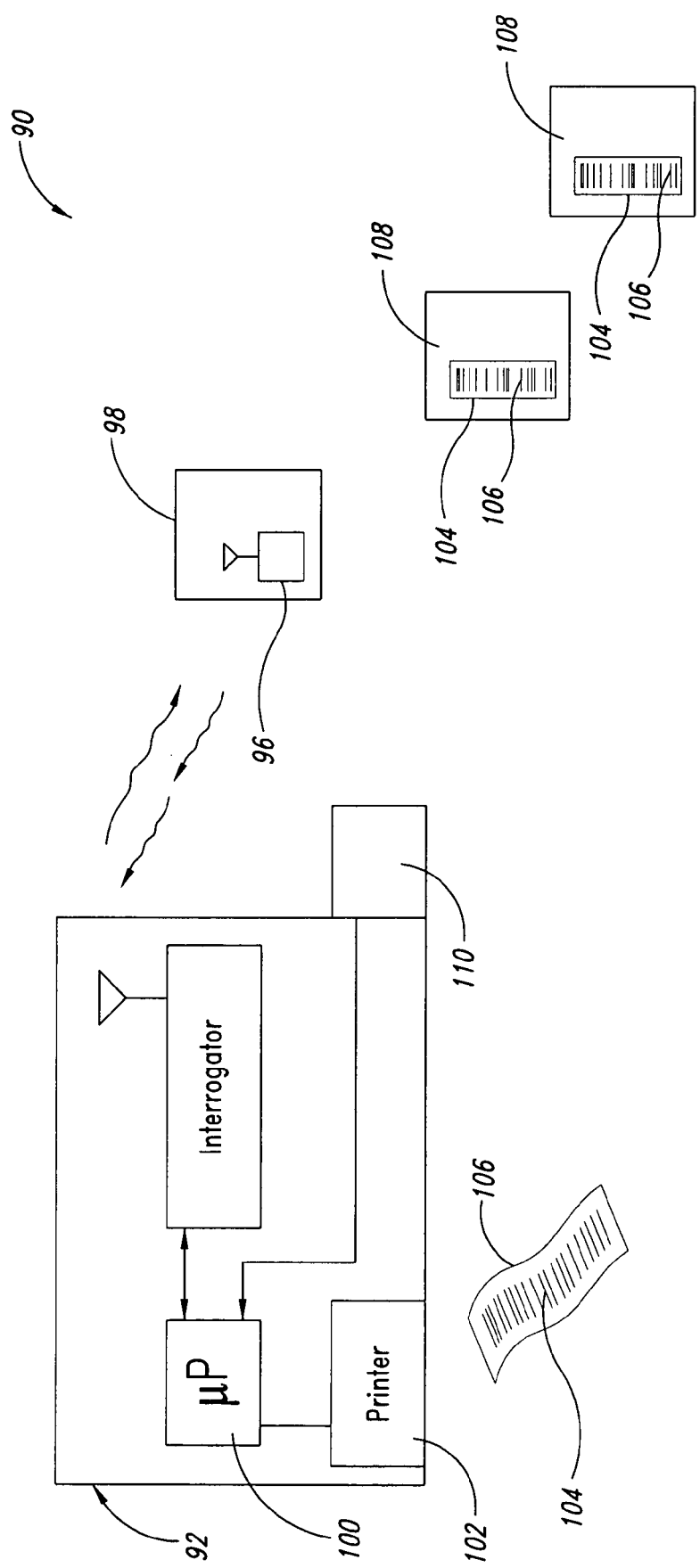
FIG. 5 is a schematic illustration of a further embodiment of the invention for use with barcoded data and radio frequency identification tags.

FIG. 5 represents another embodiment of the invention wherein a multimedia system 90 is shown that is configured similar to the system 66 of FIG. 4 in that a programmer station 92 is provided for converting RFID data to barcode format. The station 92 has an RF interrogator 94 as a component thereof for RF communication with a tag 96 that in this aspect of the invention is attached to a shipping container 98. The station 92 also includes a microprocessor 100 for converting data read from the tag to barcode format and a printer 102 for generating a label 104 with the barcode 106 thereon.

In use, the shipping container 98 arrives in warehouse or other receiving facility with the tag 96 associated with it, such as attached to the container 98 or packaged inside the container 98. As items 108 in the container 98 are unpacked and removed, the interrogator 94 communicates with the tag to recover data regarding the items 108 stored therein. The microprocessor 100 converts the data to barcode format and a label 104 is printed for application to each item 108. The barcode 106 may be unique to each item 108 or common as to all items 108 as required.

It is to be understood that the process described above can be reversed. That is, as items 108 are prepared for packaging, a scan head 110 on the station 92 can scan the barcode 106, and the data recovered from the barcode is converted to a format for RF transmission and writing to the tag 96. In this manner, the contents of the container 98 can be inventoried at the time of packing and the data is stored on the tag 96 to accompany the container. The data may also be transmitted from the station 92 to other stations or facilities for further processing.

Figure 6:
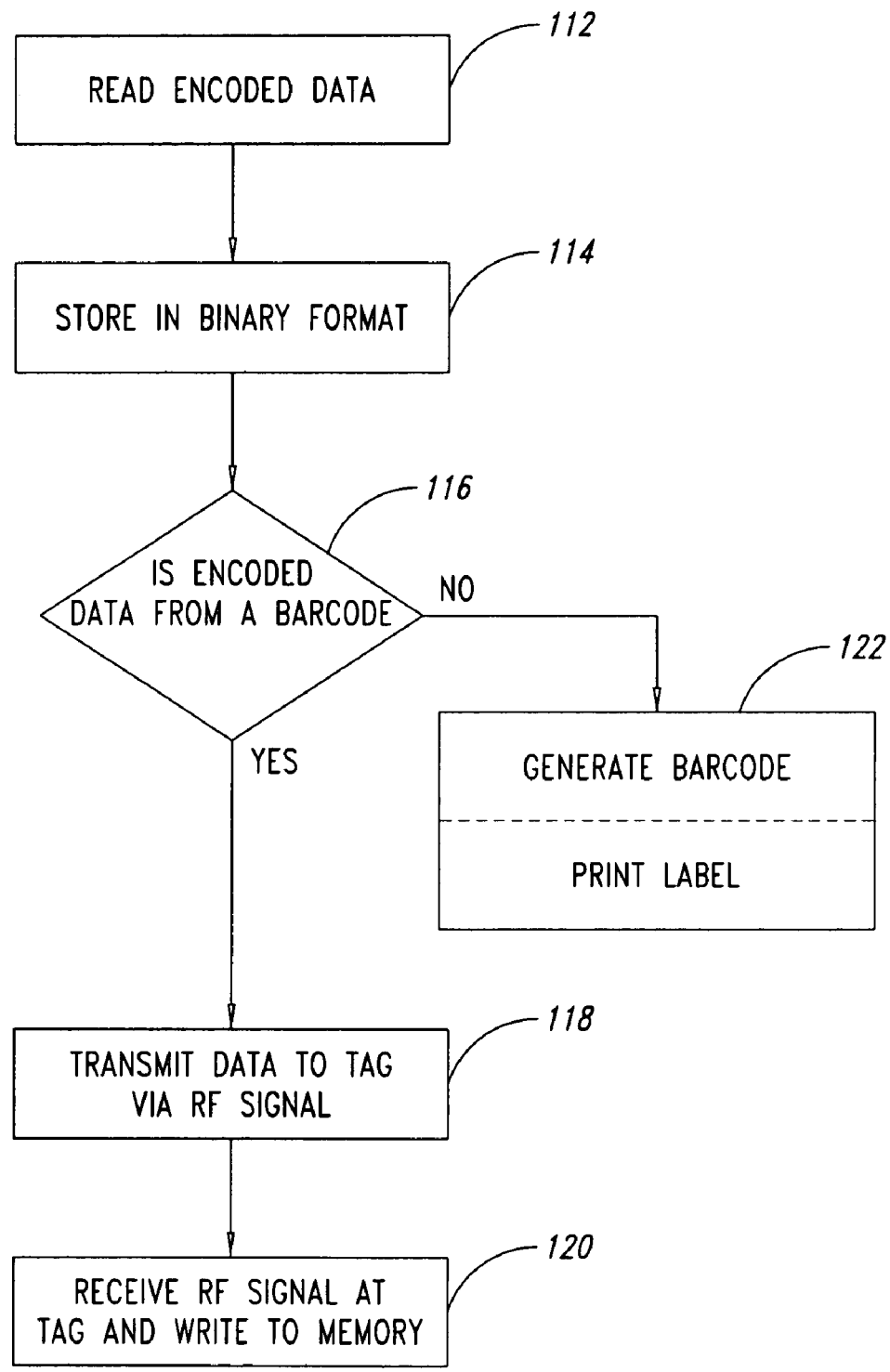
FIG. 6 is a flowchart representative of one method for converting encoded data in multiple media in accordance with the present invention.

Hence, as shown in FIG. 6, the method in accordance with another embodiment of the invention generally involves a first step 112 of reading encoded data, such as a barcode or interrogating an RFID tag and storing 114 the same in a first format, such as a binary format. It is to be understood that other formats may be used if desired, although the binary format is typically used in most low-cost RFID tags. The step of storing the data 114 may be skipped, and the data immediately converted to another format. In either case, the data is preferably not decoded to a usable format, such as into text or Arabic numbers. In this embodiment, a decision box 116 indicates an evaluation of the source of the encoded data, such as in this case whether it came from a barcode format. If so, then the process moves to a step of transmitting 118 the data via RF signals to a tag for a step of writing 120 to a memory in the tag. In the alternative, if the original format was not a barcode, then the process moves to the step of generating a barcode 122 on a label with the data encoded thereon.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims and the equivalents thereof.

The invention claimed is:

1. A device for converting encoded data in multiple media, comprising: a programmer configured to read information encoded in a barcode and to program an associated RFID tag with the information without decoding the encoded information, and to further read encoded information stored in an RFID tag and to produce a barcode having the information from the RFID tag encoded thereon without decoding the encoded information.

2. The device of claim 1 wherein the programmer is portable, handheld, and self-contained.

3. A device for converting encoded data into barcode format, comprising:
   a radio-frequency reader configured to read information encoded in a radio frequency transponder tag without decoding the encoded information; and
   a barcode programmer coupled to the radio-frequency reader and configured to receive the information read from the radio frequency transponder and to convert the information into a barcode format and to produce a barcode label containing the information without decoding the encoded information.

4. The device of claim 3 wherein the device is portable, handheld, and self-contained.

5. A device for converting encoded data into a format to be written to a radio-frequency transponder tag, comprising:

a barcode reader configured to read information encoded in barcode format without decoding the encoded information; and a programmer coupled to the reader and configured to receive the information read by the barcode reader and to transmit the encoded information to a radio-frequency transponder for storage in the transponder without decoding the encoded information.

6. The device of claim 5 wherein the device is portable, handheld, and self-contained.

7. A method for converting encoded data from one storage medium to another storage medium without decoding the encoded data, comprising: reading the encode data from a first medium, converting the encoded data into a second encoded form without decoding the encoded data in the second encoded form, and writing the data encoded in the second encoded form to a second media without decoding the encoded data in the second encoded form.

8. A device for converting encoded data in multiple media, comprising:

a programmer configured to read information encoded in a plurality of barcodes associated with a plurality of items and to program an individual RFID tag with the encoded information without decoding the encoded information, and to further read encoded information stored in an RFID tag and to produce a plurality of barcode labels having the information from the RFID tag encoded thereon for a plurality of items without decoding the encoded information.

9. The device of claim 8 wherein the programmer is portable, handheld, and self-contained.

10. A device for converting encoded data into barcode format, comprising:

a radio-frequency reader configured to read inventory information encoded in a radio frequency transponder tag; and a barcode programmer coupled to the radio-frequency reader and configured to receive the encoded inventory information read from the radio frequency transponder and to convert the information into a barcode format without decoding the encoded information, the programmer configured to automatically produce a plurality of barcode labels from the encoded inventory information without decoding the encoded information.

11. The device of claim 10 wherein the programmer is portable, handheld, and self-contained.

12. A device for converting encoded data into a format to be written to a radio-frequency transponder tag, comprising:

a barcode reader configured to read information encoded in barcode format; and a programmer coupled to the reader and configured to receive the information read by the barcode reader without decoding the encoded information and to automatically program the encoded information to a radio-frequency transponder without decoding the encoded information, wherein the programmer further programs destination information to the radio-frequency transponder.

13. The device of claim 12 wherein the programmer is portable, handheld, and self-contained.

14. A method for converting encoded data from one storage medium to another storage medium, comprising:

reading the encoded data from a first medium;

converting the encoded data into a second encoded form without decoding the encoded data; and automatically writing the data encoded in the second encoded form to a second medium without decoding the encoded data in the second encoded form.

15. The method of claim 14 further comprising automatically writing the data encoded in the second encoded form to a third medium.

16. The method of claim 15 wherein the second and third mediums are barcode labels.

17. The device of claim 8 wherein the RFID tag is attached to a shipping container for the plurality of items.

18. The device of claim 17 wherein the RFID tag stores destination information.

19. The device of claim 18 wherein the RFID tag further stores origination information.

20. The device of claim 8 wherein the device is configured to transmit the information to a second device for converting encoded data in multiple media, the second device including a second programmer.

21. The device of claim 10 wherein the RFID tag is attached to a shipping container for the plurality of items.

22. The device of claim 21 wherein the RFID tag stores destination information.

23. The device of claim 22 wherein the RFID tag further stores origination information.

24. The device of claim 10 wherein the device is configured to transmit the information to a second device for converting encoded data in multiple media, the second device including a second programmer.

* * * * *